United States Patent
Lee (10) Patent No.: US 6,292,179 B1
(45) Date of Patent: Sep. 18, 2001

(54) SOFTWARE KEYBOARD SYSTEM USING TRACE OF STYLUS ON A TOUCH SCREEN AND METHOD FOR RECOGNIZING KEY CODE USING THE SAME

(75) Inventor: Jin-chul Lee, Anyang (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/304,268

(22) Filed: May 6, 1999

(30) Foreign Application Priority Data

May 12, 1998 (KR) .................................. 98-16969

(51) Int. Cl.$^7$ ...................................................... G09G 5/00
(52) U.S. Cl. .......................... 345/173; 345/168; 345/179
(58) Field of Search ..................................... 345/173, 179, 345/168, 174–178; 400/165.1; 382/180–190

(56) References Cited

U.S. PATENT DOCUMENTS

| | | | | |
|---|---|---|---|---|
| 4,310,839 | * | 1/1982 | Schwerdt ............................ | 345/173 |
| 4,440,513 | * | 4/1984 | Kataoka et al. .................. | 400/165.1 |
| 5,376,947 | * | 12/1994 | Kuroda ................................ | 345/173 |
| 5,956,021 | | 9/1999 | Kubota et al. ....................... | 345/179 |

FOREIGN PATENT DOCUMENTS

| | | | |
|---|---|---|---|
| 0 660 218 | 6/1995 | (EP) ............................. | G06F/3/033 |
| 9-81320 | 3/1997 | (JP) . | |
| WO 97/30386 | 8/1997 | (WO) ............................. | G06F/3/033 |

\* cited by examiner

Primary Examiner—Chanh Nguyen
Assistant Examiner—Uchendu O. Anyaso
(74) Attorney, Agent, or Firm—Sughrue, Mion, Zinn, Macpeak & Seas, PLLC (57) ABSTRACT

A software keyboard system using the trace of a stylus and a method of recognizing key codes in accordance with the keyboard system are provided. The software keyboard system includes a screen for displaying a keyboard image or other information, a touch panel formed of a transparent material covered on the screen, for generating a coordinate value in accordance with a position pressed by a stylus, an analog-to-digital (A/D) converter for converting an analog coordinate value generated by the touch panel to a digital coordinate value, a memory for storing names of keys forming a keyboard image displayed on the screen and direction range information of a plurality of key codes assigned to each of keys, and a controller for displaying the keyboard image formed by the key names on the screen, receiving a digital value for the trace of the stylus output from the analog-to-digital (A/D) converter to retrieve a position of the stylus and a direction of the trace, reading a key code from the memory according to the stylus position and the trace direction, and outputting the key code. Thus, one key includes numerous codes, to thereby reduce the number of keys, so that the size of the keyboard is reduced without reducing the key size, to thereby facilitate use of the key.

13 Claims, 11 Drawing Sheets

SOFTWARE KEYBOARD SYSTEM USING TRACE OF STYLUS ON A TOUCH SCREEN AND METHOD FOR RECOGNIZING KEY CODE USING THE SAME

BACKGROUND OF THE INVENTION

1. Field of the Invention

The present invention relates to a software keyboard system using a touch screen, and more particularly, to a software keyboard system in which a plurality of key codes are assigned to one key, and using the trace of a stylus moving on a key displayed on a touch screen, a key code is generated, and to a method for recognizing a key code using the same. Here, "stylus" is used as a general term for any object which, when pressed onto a touch screen, can cause an input to a computer system or the like.

2. Description of the Related Art

In a small-sized personal computer (PC) such as an electronic organizer or a palm PC, it is difficult to input information. That is, since a small area of the keyboard must include a multitude of keys, the size of the key must be reduced, and thus it is difficult to rapidly and accurately input information using the keys.

To solve the above problems, software keyboards using a touch screen are being widely used.

According to U.S. Pat. No. 4,725,694 in which a central processing unit (CPU) displays an image of a complete keyboard on a screen where a touch panel is attached, the CPU recognizes the position of the touch panel pressed by a user, and operates to generate a code for a key corresponding to the position.

However, in the U.S. Pat. No. 4,725,694, since the size of the screen where the entire keyboard is displayed is small, the size of the keys is also small so that it is difficult to accurately select keys, and the surface of the typical touch panel is slippery, thereby resulting in undesired key selection.

Also, according to U.S. Pat. No. 5,612,719, the CPU displays a gesture button image on a screen where a touch panel is attached, and then the touch panel is pressed or moved on by a pen, allowing various operation modes according to the movement of the pen. That is, there are various operation modes in accordance with whether the stylus is placed on the screen or not, and whether a pop-up menu is displayed on the screen.

However, in order to select function from a pop-up menu, a two-step input process is required in which a pop-up menu is displayed, and then a desired menu is selected from the pop-up menu.

SUMMARY OF THE INVENTION

To solve the above problems, it is a first objective of the present invention to provide a software keyboard system using the trace direction of a stylus, in which a key includes a plurality of key codes, and thus one key code is selected in accordance with the trace of the stylus drawn on the key.

It is a second object of the present invention to provide a method for recognizing a key code in accordance with the keyboard system.

To achieve the first objective, there is provided a software keyboard system using a touch screen, comprising:

a screen for displaying a keyboard image or other information;

a touch panel formed of a transparent material covered on the screen, for generating a coordinate value in accordance with a position pressed by a stylus;

an analog-to-digital (AID) converter for converting an analog coordinate value generated by the touch panel to a digital coordinate value;

a memory for storing names of keys forming a keyboard image displayed on the screen and direction range information of a plurality of key codes assigned to each of keys; and a controller for displaying the keyboard image formed by the key names on the screen, receiving a digital value for the trace of the stylus output from the analog-to-digital (A/D) converter to retrieve a position of the stylus and a direction of the trace, reading a key code from the memory according to the stylus position and the trace direction, and outputting the key code.

The controller displays an image of the generated key code for a predetermined time to distinguish the image from images of other key codes, and then restores the image to its original state.

The memory includes a key information table which stores names of keys to be displayed on the screen as a keyboard image and an address information in which on key codes assigned to each key is stored, and a key code table which stores a direction range information on each of key codes assigned to a key, a key displayed on the screen as the keyboard image has two or more key codes each of which has direction range information different from each other, and the direction range information of the key code refers to a minimum value and a maximum value of the trace direction of the stylus.

To achieve the second objective, there is provided a method for recognizing key codes, in a software keyboard system using a touch panel, comprising the steps of:

(a) displaying an image of a keyboard;

(b) obtaining the trace of a stylus;

(c) determining a key area in which the trace of the stylus is drawn;

(d) obtaining a trace direction of the stylus drawn on the determined key area; and (e) searching key code information in accordance with the trace direction to generate a key code corresponding to the searched key code information.

It is preferable to further comprise the step of displaying an image of the key code generated by step (e) to be distinguished from other key codes, and then restoring the image to its original state.

The step (b) of obtaining the trace of the stylus, comprises the steps of: (b1) obtaining a coordinate value of a start point in which the stylus contacts a touch panel; (b2) obtaining a coordinate value in which the stylus contacts the touch panel, after a predetermined time; and (b3) determining whether the point obtained in the step (b2) is an end point, and obtaining the end point.

It is also preferable that in the step (c), it is checked whether all coordinate values of the trace drawn by the stylus are within the range defined as a key area, or a part of coordinate values of the trace drawn by the stylus is within the range defined as a key area.

The step (d) of obtaining the trace direction comprises the steps of: (d1) obtaining a vector composed of coordinate values of a start point and an end point of the stylus trace; (d2) calculating the magnitude of the obtained vector; (d3) comparing the magnitude of the vector with the magnitude of a reference vector; and (d4) determining the trace direction to be zero if the vector magnitude is smaller than the magnitude of the reference vector, and obtaining the trace direction by calculating an angle between the vector and a reference line if the magnitude of the vector is larger than the magnitude of the reference vector.

In the step (d1) of obtaining the vector, an initial unstable stroke is removed from the trace of the stylus considering a characteristic of the stylus sliding on the touch panel, to obtain the vector.

In the step (d) of obtaining the trace direction, a trace of the stylus is divided into a plurality of vectors each of which includes coordinate values of a start point and an end point of each partial trace, and has a weight value proportional to the magnitude thereof, and a trace direction of the stylus is obtained by an average of the weighted vectors.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 1:
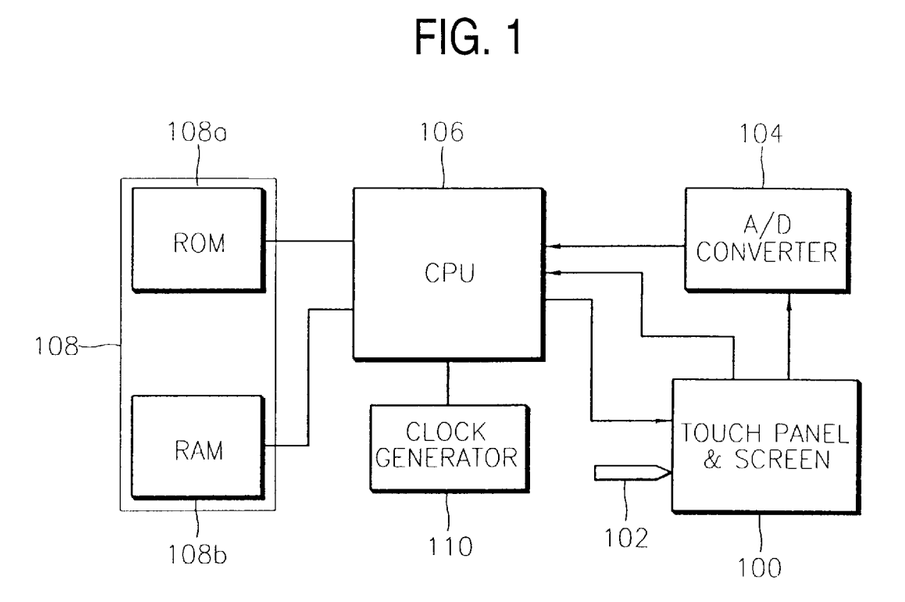
FIG. 1 is a block diagram of a software keyboard system using the trace of a stylus according to the present invention.

The keyboard system shown in FIG. 1 includes a touch panel/screen 100, a stylus 102, an analog-to-digital (A/D) converter 104, a central processing unit (CPU) 106, a memory 108 and a clock signal generator 110.

Figure 2:
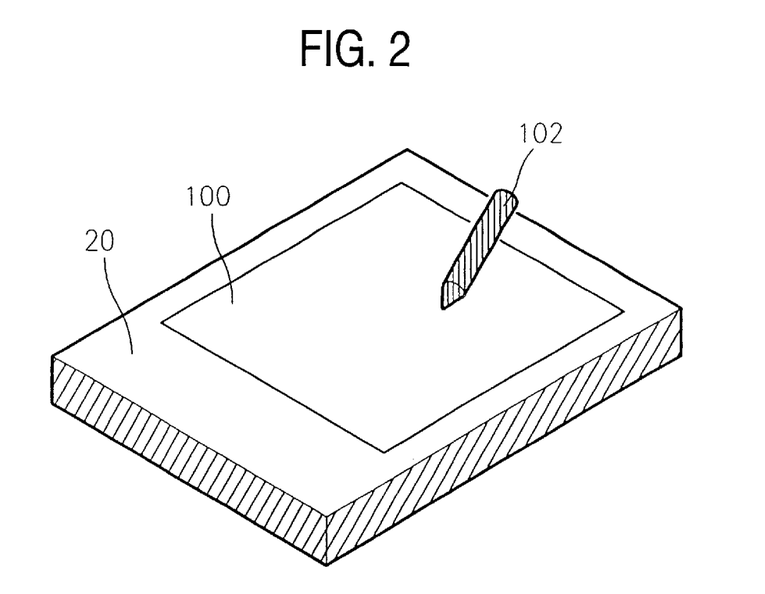
FIG. 2 shows the structure of the touch panel/screen of FIG. 1.

Referring to FIG. 2, the screen is for displaying a keyboard or an information image according to the control of the CPU 106, and the touch panel made of a transparent material is covered on the screen. If a position of the touch panel is pressed by a stylus 102, a coordinate value with respect to vertical and horizontal directions of the touch panel is generated. In FIG. 2, the screen and the touch panel are formed of a body.

The stylus 102 is for selecting a desired key code by contacting with the touch panel.

The A/D converter 104 converts an analog coordinate value generated by moving the stylus 102 on the touch panel 100 to a digital coordinate value.

The memory 108 includes a ROM 108a and a RAM 108b, and stores information of the keyboard.

The clock signal generator 110 synchronizes the CPU 106 with other blocks.

The CPU 106 displays a keyboard image on the screen 100, controls the A/D converter 104 to output a coordinate value generated while the stylus 102 contacts with the touch panel 100, determines a key area of the keyboard, using the coordinate value output by the A/D converter 104, calculates the vector size and the vector direction drawn by the stylus, using the coordinate value, to generate a key code corresponding to the calculated vector size and direction, and may change the keyboard image corresponding to the generated key code for a predetermined time to distinguish the generated, or selected key code from the other key codes on the key.

Figure 3:
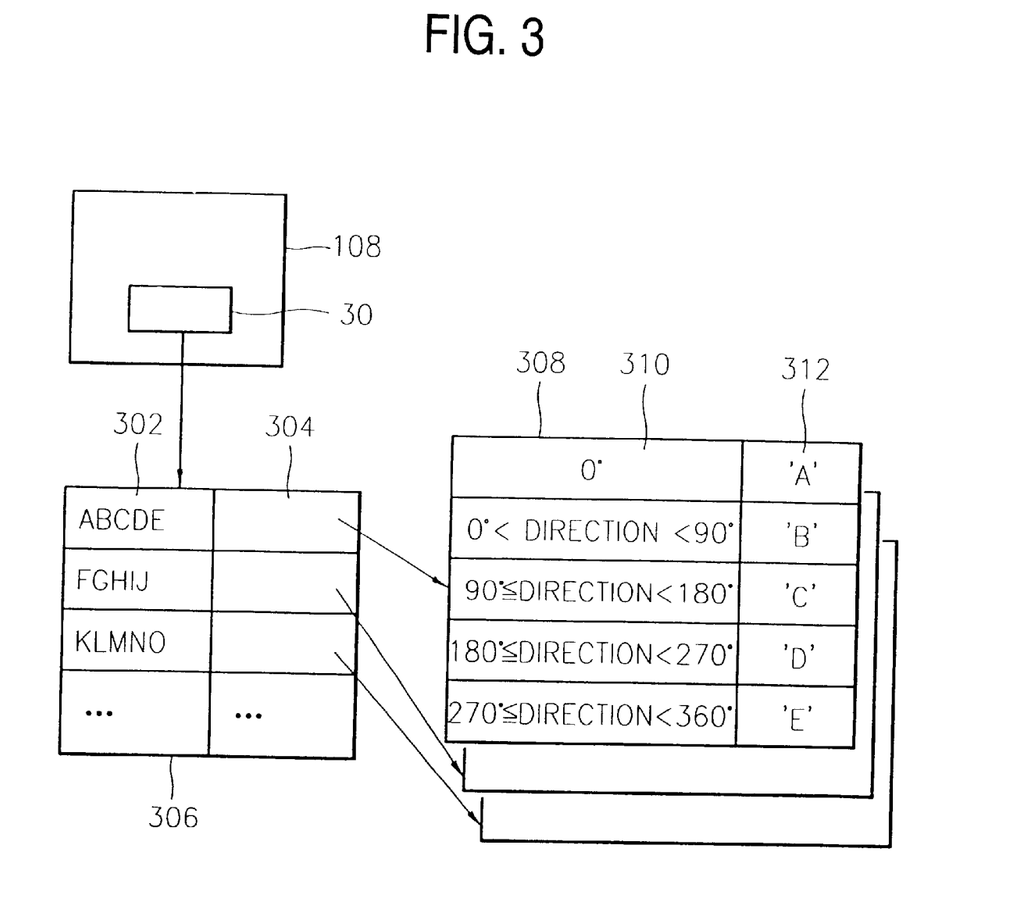
FIG. 3 shows an example in which keyboard information is stored in a memory shown in FIG. 1.

Referring to FIG. 3, reference numeral 108 indicates a memory in which keyboard information 30 is stored, reference numeral 306 indicates a key information table including key names 302 e.g., ABCDE, FGHIJ, . . . , to be displayed as the keyboard image, and key information 304 representing addresses of the memory 108 where information 308 of a plurality of key codes of the corresponding key are stored. Also, the key code arrangement information table 308 has direction range information 310 corresponding to each key code 312. The direction range information 310 for each key code indicates minimum and maximum values of the trace direction range of the stylus drawn on the key.

Figure 4A:
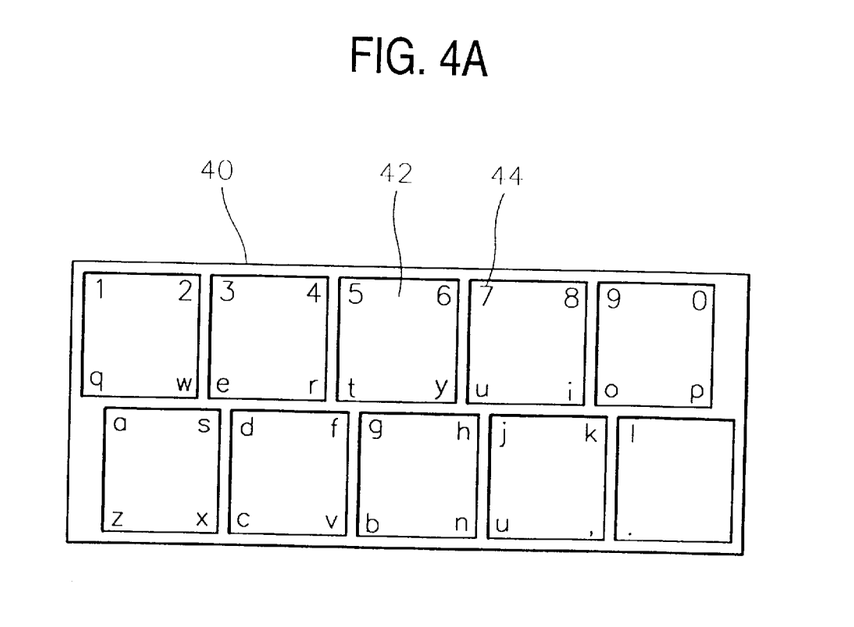
FIGS. 4A and 4B show an example of a keyboard image displayed on the screen and key codes assigned to each key.
Figure 4B:
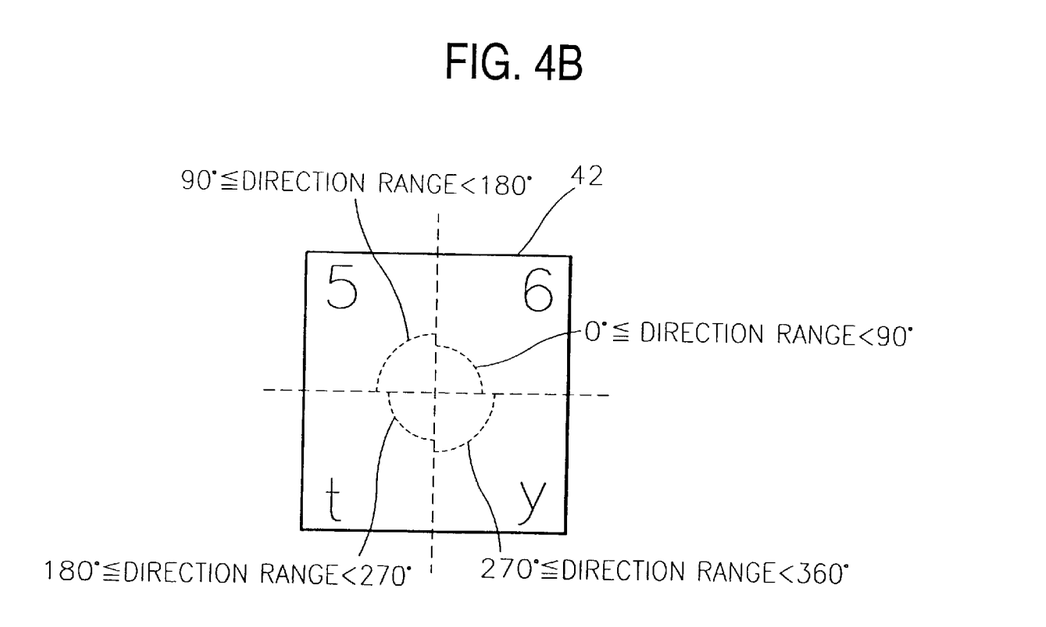

In FIG. 4A, reference numeral 40 indicates a keyboard, reference numeral 42 indicates one of a plurality of keys forming the keyboard 40, and reference numeral 44 indicates one of a plurality of key codes arranged on the key 42. In FIG. 4B, each of the key codes for a key has a different respective direction range which does not overlap with that of as the others of the key codes of that key.

Referring to FIG. 4A, the keyboard 40 includes ten keys, each of which has four or fewer key codes 44, for example 6, 5, t and y for the key 42. As shown in FIG. 4B, direction ranges of each of the key codes for the key 42 are illustrated. For example, the direction range of the key code 6 is equal to or greater than 0° and less than 90°. The direction range of the key code 5 is equal to or greater than 90° and less than 180°. The direction range of the key code t is equal to or greater than 180° and less than 270°. The direction range of the key code y is equal to or greater than 270° and less than 360°.

Figure 5A:
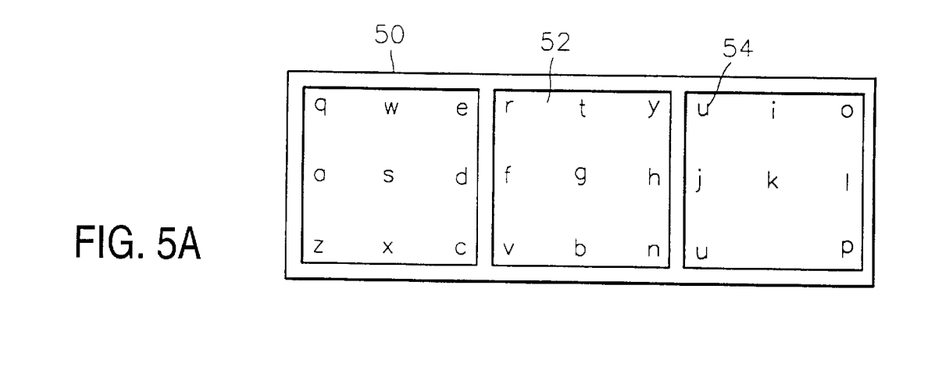
FIGS. 5A and 5B show another example of a keyboard image displayed on the screen and key codes assigned to each key.
Figure 5B:
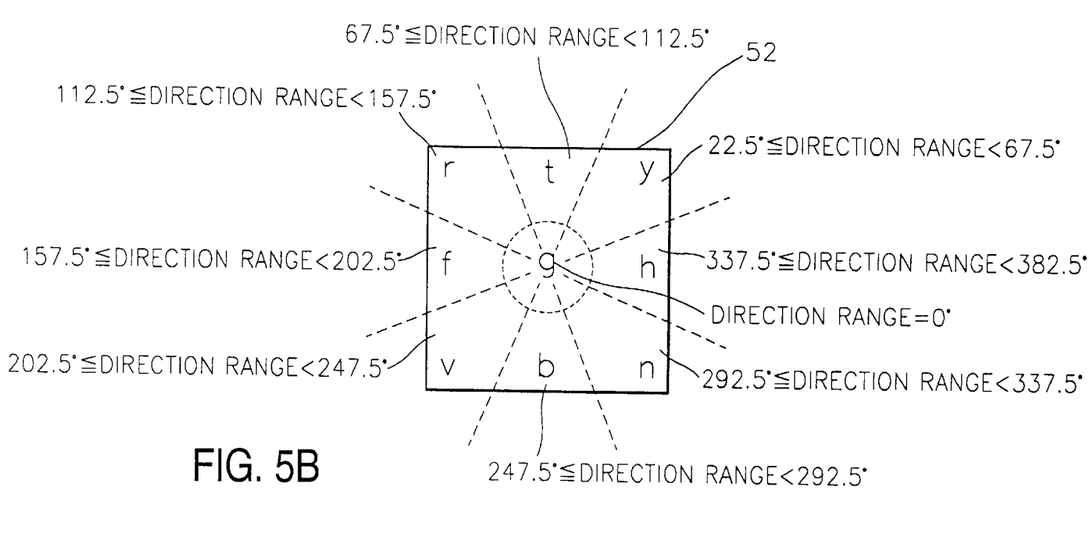

In FIG. 5A, reference numeral 50 indicates a keyboard, reference numeral 52 indicates a key forming the keyboard 50, and reference numeral 54 indicates a key code arranged on the key 52. FIG. 5B shows a direction range of key codes with respect to the key 52.

Referring to FIG. 5A, the keyboard 50 includes three keys 52, each of which has 9 or fewer key codes. As shown in FIG. 5B, direction ranges of each of the key codes for the key 52 are illustrated. For example, the direction range of the key code y is equal to or greater than 22.5° and less than 67.5°. The direction range of the key code t is equal to or greater than 67.5° and less than 112.5°. The direction range of the key code r is equal to or greater than 112.5° and less than 157.5°. The direction range of the key code f is equal to or greater than 157.5° and less than 202.5°. The direction range of the key code v is equal to or greater than 202.5° and less than 247.5°. The direction range of the key code b is equal to or greater than 247.5° and less than 292.5°. The direction range of the key code n is equal to or greater than 292.5° and less than 337.5°. The direction range of the key code h is equal to or greater than 337.5° and less than 382.5°. The direction range of the key code g is 0°.

Figure 6:
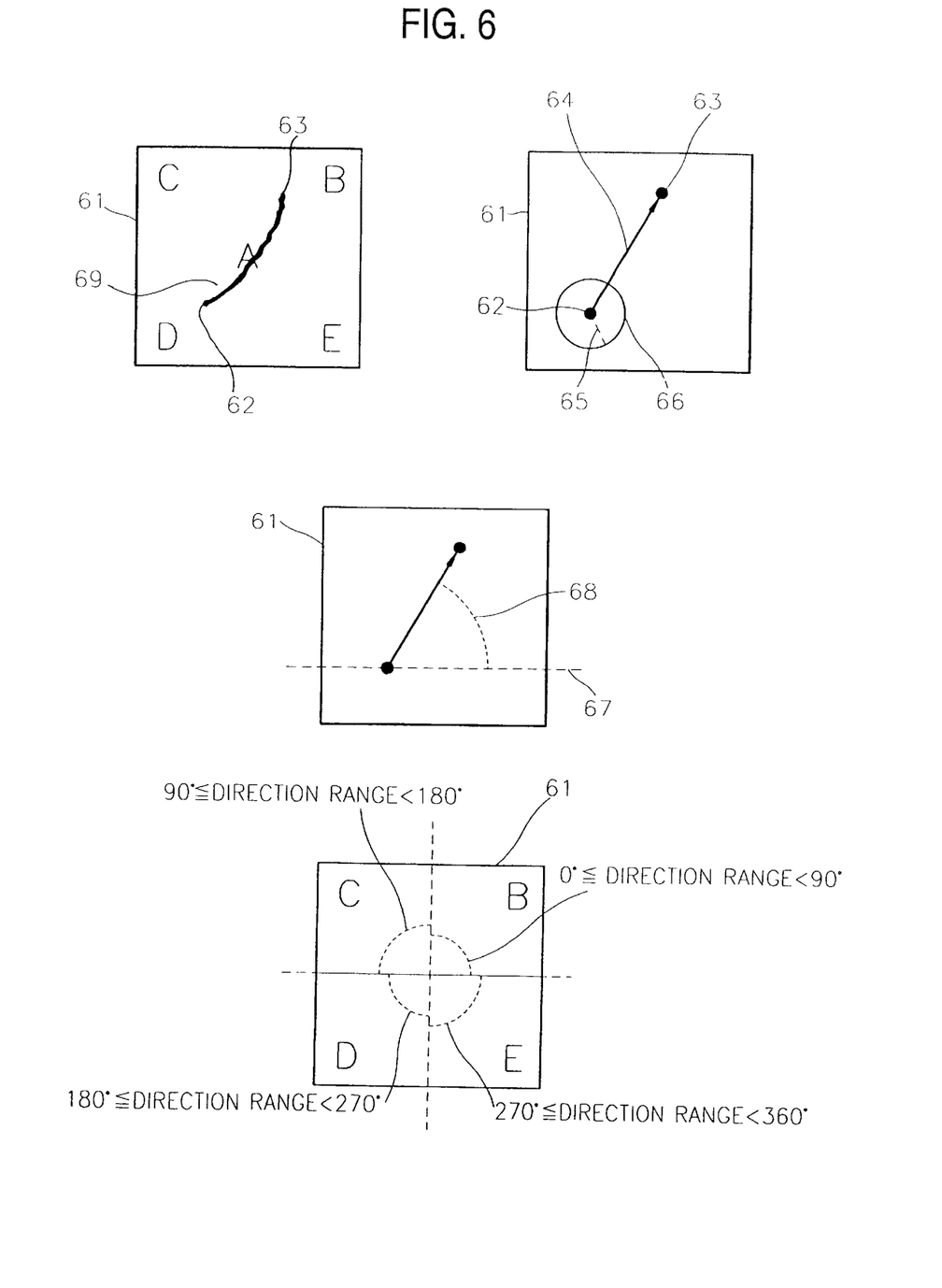
FIG. 6 shows an example of a method for obtaining the trace direction of a stylus and the directional range of each key code.

Referring to FIG. 6, a key 61 includes a key code A in the center and four key codes B, C, D and E at each corner. The magnitude of a vector 64 formed by coordinate values of a start point 62 and an end point 63 of a trace 69 is calculated. If the magnitude of the calculated vector is less than a minimum vector magnitude 65 formed by a minimum radius 66, the direction of the vector 64 is determined as 0° (i.e., key code A is indicated), and if the magnitude of the vector 64 is more than the minimum vector magnitude 65, an angle 68 between the vector 64 and a horizontal line 67 is calculated to determine the direction of the vector 64.

In the example of FIG. 6, the vector direction of the trace is greater than 0° and less than 90°. Here, the minimum vector magnitude 65 which is a value selected with reference to the size of the key image and the error range of the touch panel, may be variously defined.

FIG. 3 shows an example of key code arrangement information 308 of the key 61 of FIG. 6 which is named as 'ABCDE'. The direction of the trace 69 of FIG. 6 is greater than 0° and less than 90°, so that a central processing unit (CPU) 106 generates a key code B. Also, if the direction of the trace is equal to or greater than 90° and less than 180°, the CPU 106 generates a key code C, and if equal to or greater than 180° and less than 270°, the CPU 106 generates a key code D, and if equal to or greater than 270° and less than 360°, the CPU 106 generates a key code E. At this time, if the CPU 106 generates a key code, an image corresponding to the generated key code may be changed for a user more easily to identify the generated key code. In FIGS. 7A to 7D, when four key codes 1, 2, q and w are arranged in a key 71, and a trace is drawn on the key 71 by a stylus, one of the key codes is generated according to the trace direction and is identified by changing the image for the generated key code.

Figure 7A:
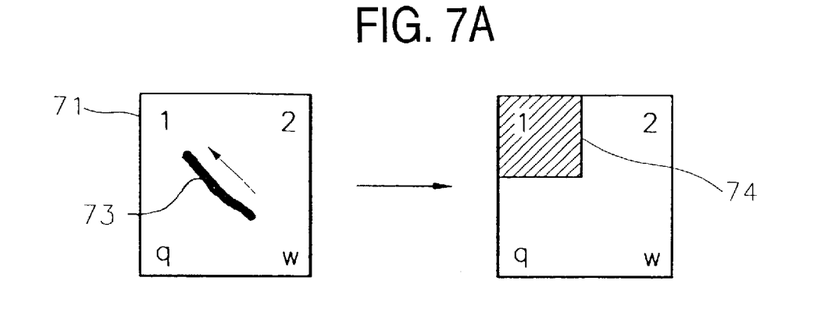
FIGS. 7A through 7D show an example of changing an image of a generated key code.
Figure 7B:
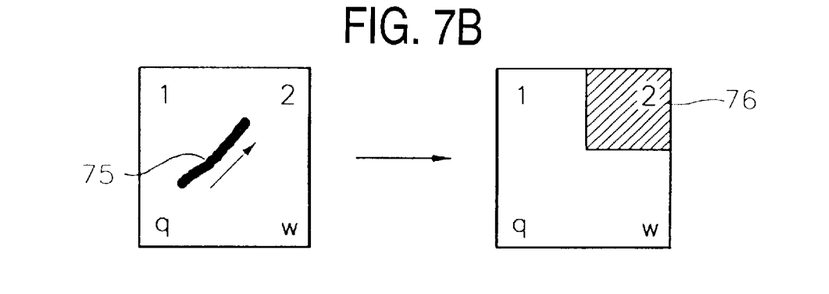
Figure 7C:
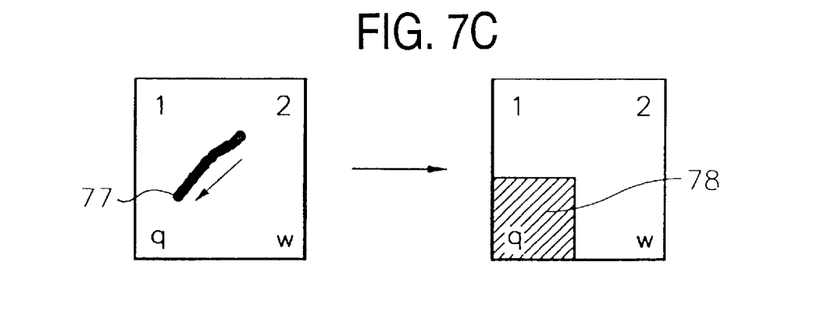

FIG. 7A shows an example of generating a key code 1 from a trace 73 drawn leftward and upward, and FIG. 7B shows an example of generating a key code 2 from a trace 75 drawn rightward and upward. FIG. 7C shows an example of generating a key code q from a trace 77 drawn leftward and downward, and FIG. 7D shows an example of generating a key code w from a trace 79 drawn rightward and downward.

The CPU 106 may change the image of the generated key code to help the user to distinguish the generated key code from other key codes on that key. That is, in FIG. 7A, a character color and a background color of a key code 74 of 1 selected by a trace 73 drawn on a key 71 may be changed to be distinguished from other key codes.

Figure 7D:
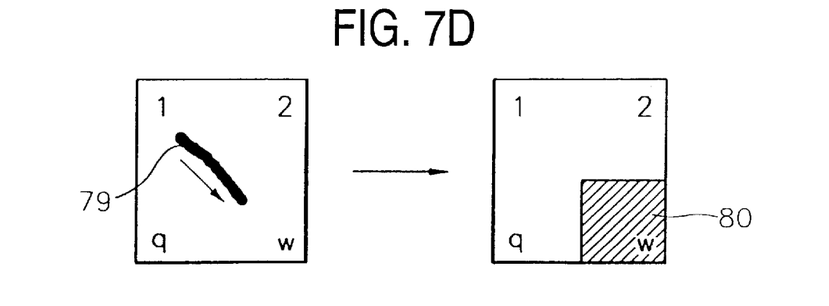

The key codes 76, 78 and 80 of 2, q and w of FIGS. 7B, 7C and 7D are also changed as explained in FIG. 7A. The CPU 106 returns the changed colors of the key code to its original color after a predetermined time or when another trace is drawn. In FIGS. 8A to 8D, a key 81 has a key code S located at a center and eight key codes e, w, q, a, z, x, c and d located at four corners and four sides. When a trace is drawn on the key 81, one of the key codes is generated according to the trace direction and is identified by changing the image of the key.

Figure 8A:
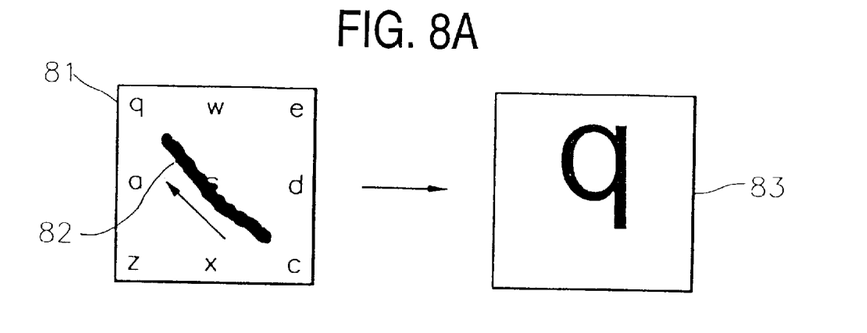
FIGS. 8A through 8D show another example of changing an image of a generated key code.
Figure 8B:
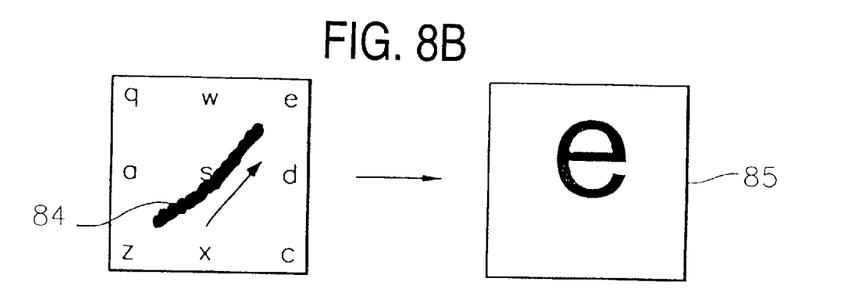
Figure 8C:
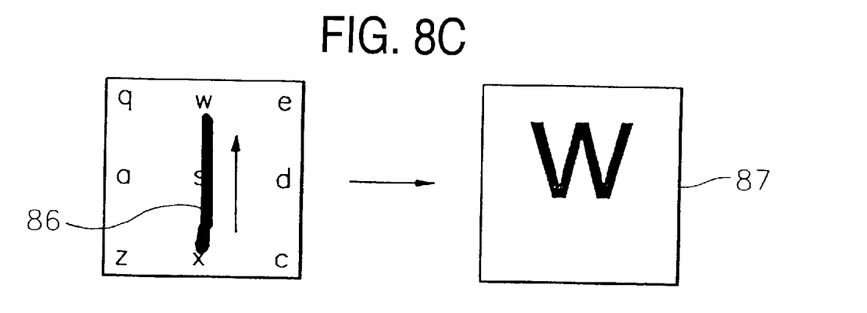
Figure 8D:
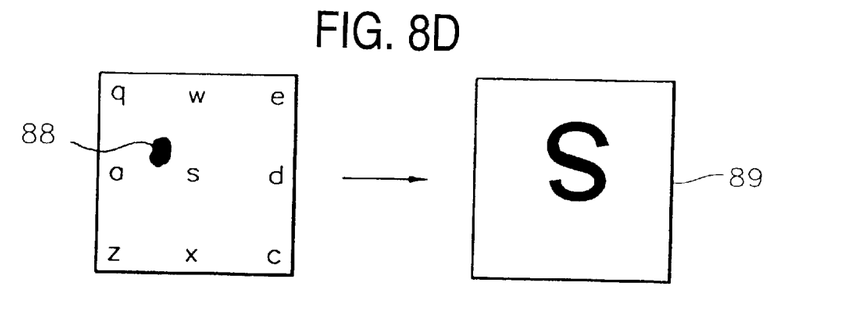

FIG. 8A shows an example of generating a key code q in accordance with a trace 82 drawn leftward and upward, and FIG. 8B shows an example of generating a key code e in accordance with a trace 84 drawn rightward and upward. FIG. 8C shows an example of generating a key code w in accordance with a trace 86 drawn upward, and FIG. 8D shows an example of generating a key code s in accordance with a trace smaller than the minimum vector size.

The CPU 106, in this embodiment, enlarges the image of the selected key code and hides the other key codes, thereby to enable a user easily to identify the selected key code.

In FIG. 8A, the key code q selected by a trace 82 drawn on a key 81 is enlarged, and at the same time other key codes disappear. When selected key codes e, w and s in FIGS. 8B, 8C and 8D are also enlarged, respectively, the other key codes disappear.

As shown in FIGS. 4 and 5, a keyboard image having various keys is displayed on the screen, so that if a trace is drawn on the touch panel of an image of a key as shown in FIG. 6, the CPU 106 obtains trace data converted to digital data through an analog-to-digital (A/D) converter 104. Here, the trace is a set of the coordinate values of the stylus obtained in a predetermined time while the stylus contacts the touch panel.

Subsequently, a method for obtaining the trace of the stylus in the CPU 106 will be described as follows.

Figure 9:
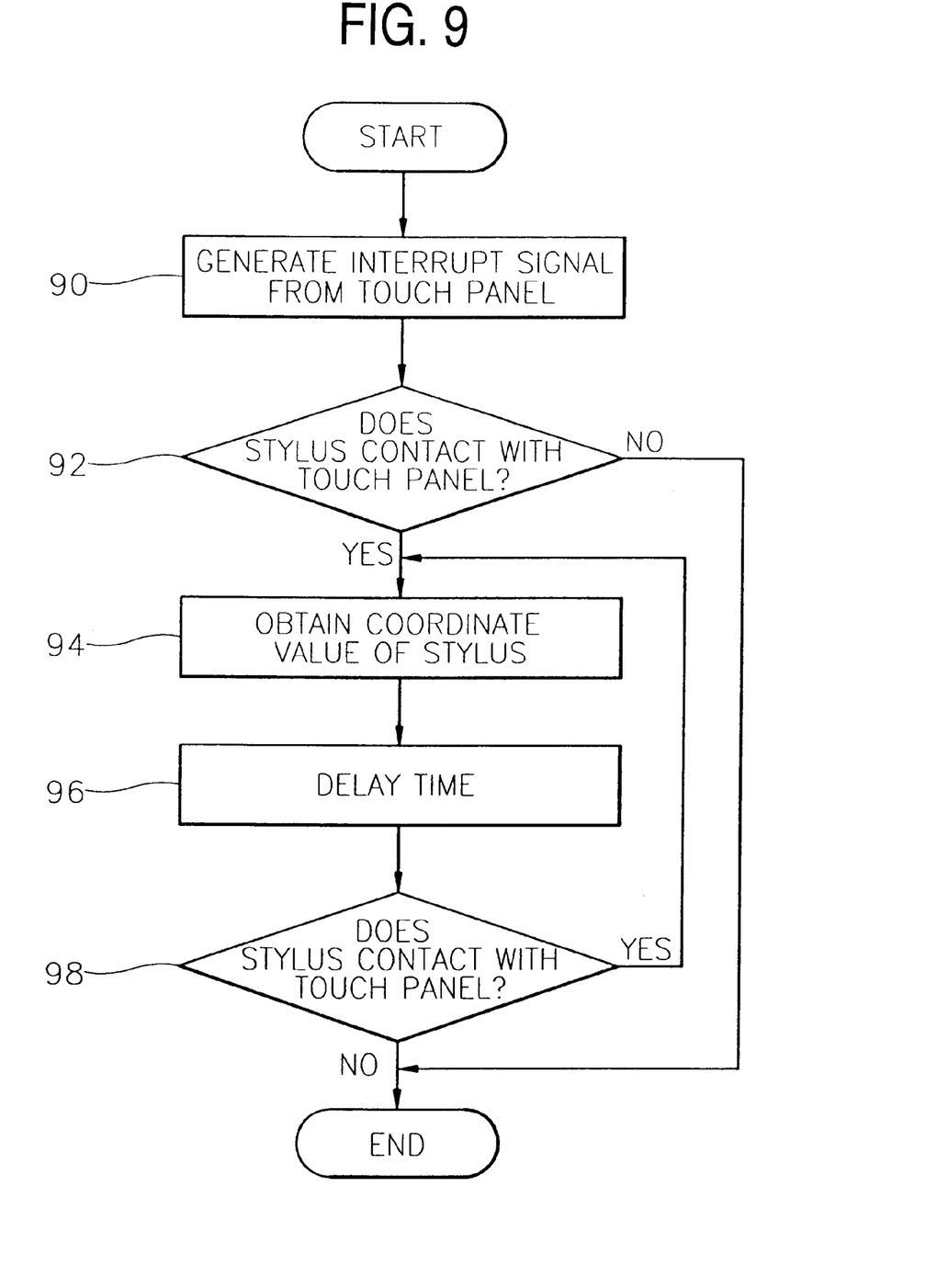
FIG. 9 is a flowchart for illustrating a method for obtaining the trace of a stylus.

Referring to FIG. 9, if the stylus 102 contacts the touch panel 100, an interrupt signal 109 is generated from the touch panel 100 (step 90). If the interrupt signal 109 is generated, the CPU 106 determines whether the stylus 102 continuously contacts the touch panel, through the A/D converter 104 (step 92). If the stylus 102 is contacting the touch panel 100, the CPU 106 obtains a coordinate value of the stylus 102 through the A/D converter 104 (step 94). After a predetermined time (step 96), the CPU 106 determines whether the stylus 102 contacts the touch panel as before, through the A/D converter 104 (step 98). If the stylus 102 is contacting the touch panel 100, another coordinate value of the stylus 102 is obtained through the A/D converter 104 (step 94). The above process (steps 94 to 98) is repeated, so that the CPU 106 can obtain the trace of the stylus 102. Then, a key code corresponding to the trace of the stylus is generated.

Figure 10:
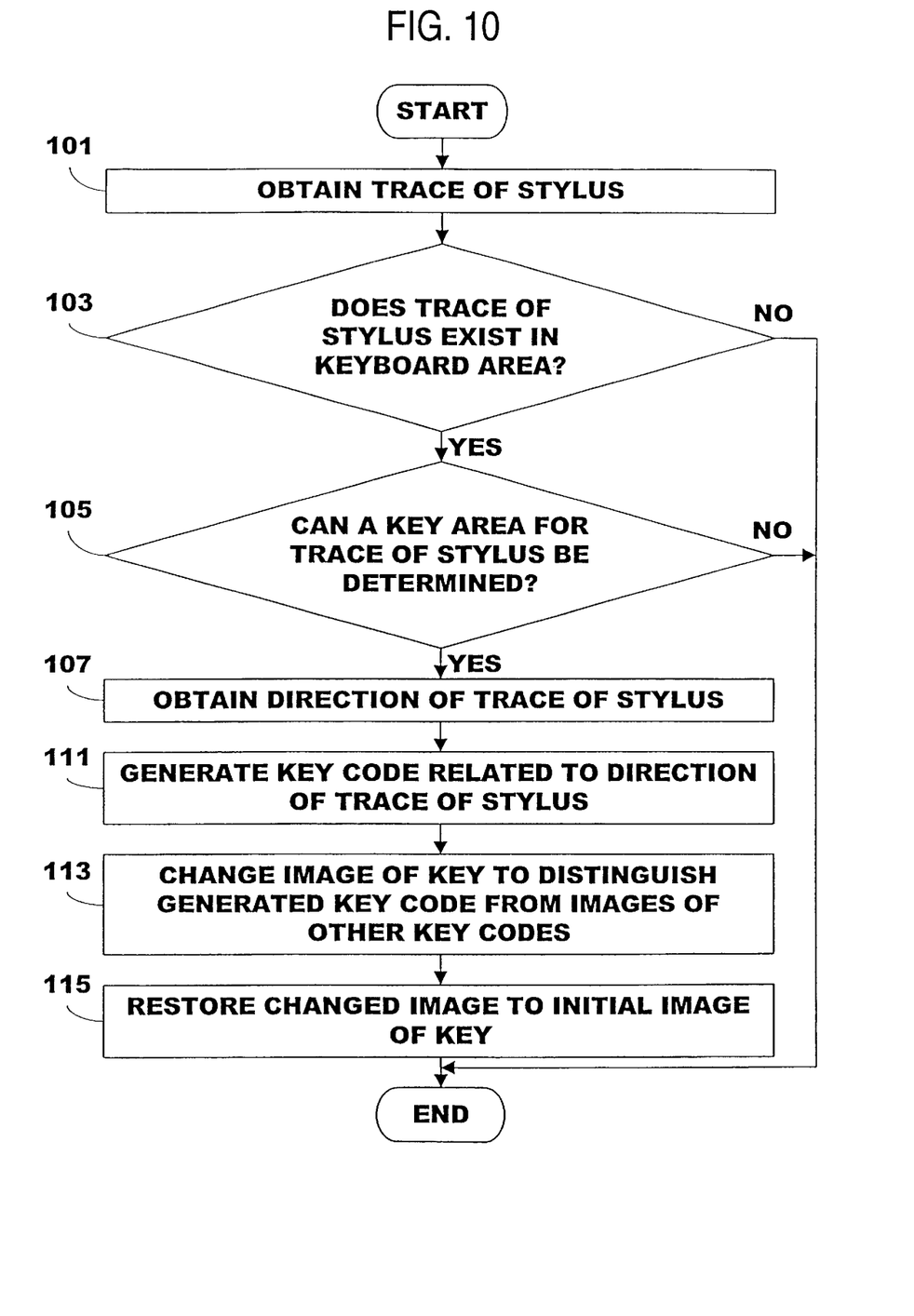
FIG. 10 is a flowchart for illustrating generation of a key code.

Referring to FIG. 10 which explains a method of generating a key code, the CPU 106 obtains the trace of the stylus 102 (step 101) as illustrated in FIG. 9. Also, the CPU 106 determines whether there is the obtained trace of the stylus 102 within a keyboard image area (step 103). If the trace of the stylus 102 is within the keyboard image area, the CPU 106 determines in which key area the trace exists (step 105, "YES" is followed when key can be determined). If the trace of the stylus 102 is within a key area, the direction of the trace is calculated (step 107), but if a particular key area cannot be determined, the processing follows the direction indicated by "NO".

The CPU 106 generates a key code corresponding to the calculated trace direction (step 111). That is, as shown in FIG. 3, the CPU 106 searches the key arrangement information 306 from keyboard information 30 stored in the memory 108, key information 304 of the key where the trace is drawn is retrieved from the key arrangement information 306, and the code arrangement information 308 is retrieved from the key information 304, and comparing the direction range information 310 of each of the codes with the direction of the trace in the code arrangement information 308, a key code 312 is generated corresponding to the trace direction.

The CPU 106 changes the image of a generated key code to distinguish the key code from other key codes (step 113), and then recovers the changed image to its original image after a predetermined time (step 115). That is, as described in FIGS. 7 and 8, in order to check the generated key code, the character form and color of the generated key code are changed, or only the generated key code is enlarged and the enlarged key code is shown.

Figure 11:
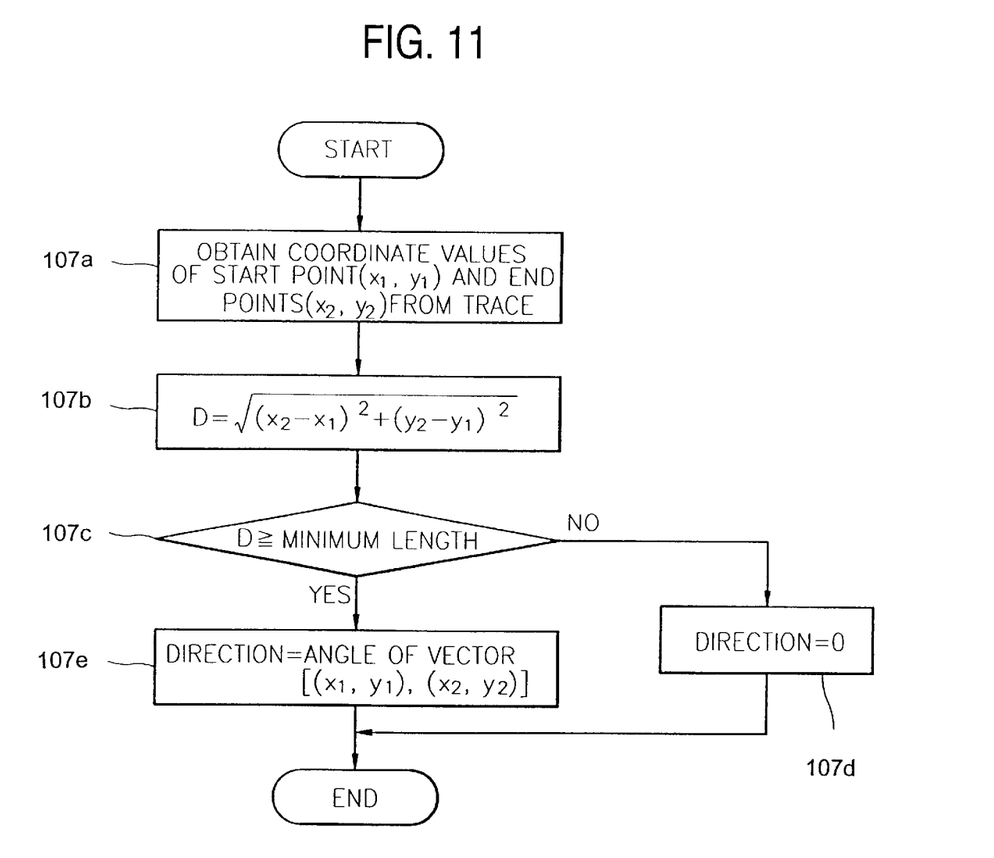
FIG. 11 is a detailed flowchart for illustrating the process of calculating the trace direction of a stylus of FIG. 10.

Referring to FIG. 11, a method of calculating a trace direction of a stylus is described in detail.

As shown in FIG. 6, a coordinate value $(x_1, y_1)$ of a start point 62 of the trace and a coordinate value $(x_2, y_2)$ of an end point 63 thereof are obtained (step 107a).

The magnitude of the vector is calculated from the coordinates of the start and end points (step 107b). That is, the magnitude D of the vector is calculated by formula 1 by which the distance between two points is obtained, as follows.

$$D=\sqrt{(x_2-x_1)^2+(y_2-y_1)^2}$$

Formula 1

It is determined whether the magnitude D of the calculated vector is greater than the reference vector magnitude 65 (step 107c). If the vector magnitude is smaller than the reference vector magnitude, the direction of the trace 69 is determined to be 0 (step 107d), and if the vector magnitude is greater than the reference vector magnitude 65, the angle 68 between the vector 64 and the horizontal line 67 is calculated to obtain the direction of the trace 69 (step 107e). That is, the direction of the trace is obtained by the angle of the vector consisting of the start point and $(x_1, y_1)$ the end point $(x_2, y_2)$.

Meanwhile, the present invention may be adapted to the case in which the touch panel and the screen of FIG. 2 are separated. For example, in a touch pad used as an input means of a desk top computer, the CPU 106 may print or attach a keyboard image on the touch pad instead of on the screen.

Also, even if all dots of the trace drawn on the key do not exist within the key area, it may yet be determined that the trace exists within the key area. Various advantageous approaches to determining whether a trace should be taken as indicating a particular key will now be discussed. That is, it may be determined that the trace exists within the key area, for example, when:

coordinate values of all dots of the trace exist within the range defined as the key area;

just a coordinate value of a start point of the trace exists within the range defined as the key area;

just a coordinate value of an end point of the trace exists within the range defined as the key area; or the magnitude of a vector between the start point and the end point of the trace existing within the range defined as the key area is larger than a half of the total vector magnitude.

Figure 12A:
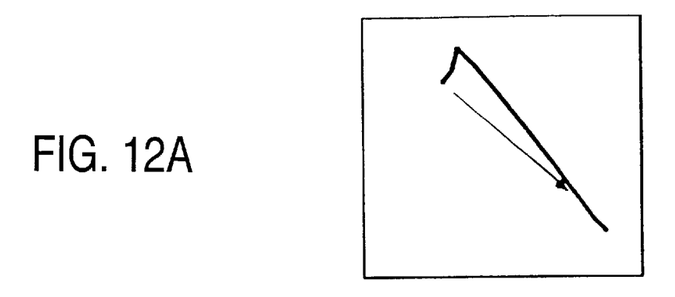
FIGS. 12A through 12D show another method for obtaining the trace direction according to the present invention.
Figure 12B:
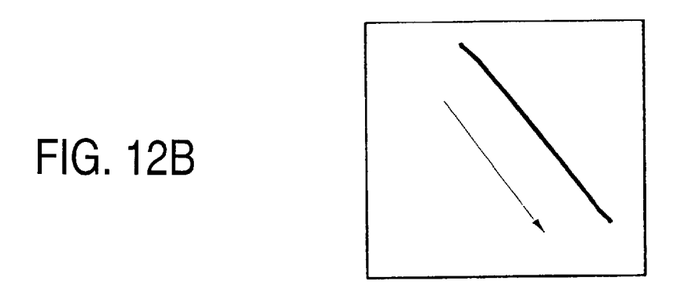
Figure 12C:
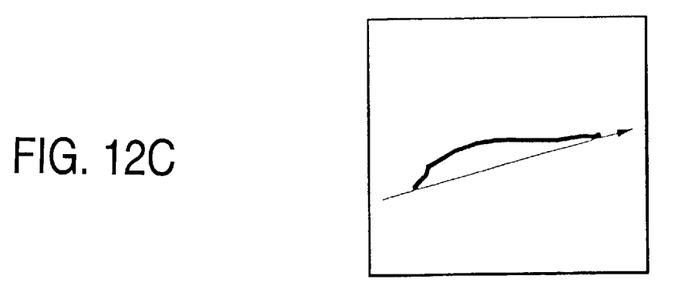
Figure 12D:
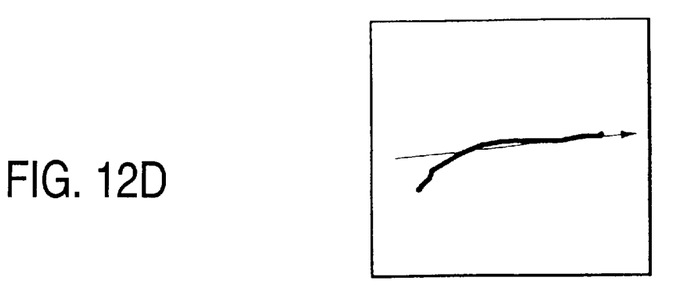

The trace direction may be obtained by points other than the start and the end points. As shown in FIGS. 12A and 12B, an initial unstable stroke may be removed from the trace, considering the characteristic of the stylus slipping on the touch panel, or, as shown in FIGS. 12C and 12D, an average direction of various points of the trace can be obtained. That is, a trace of the stylus may be divided into a plurality of vectors, each of which includes coordinate values of a start point and an end point, and has a weight value proportional to a magnitude thereof, and the trace direction may be obtained by the average of the weighted vectors.

According to the present invention, one key includes several key codes so that the number of keys is reduced. Thus, although the size of the keyboard may be small, the size of the key is not reduced, and can be easily used. Even if the key has two or more key codes or functions, the direction of the trace drawn on the keyboard is recognized so as to select a desired key code by a one-stroke input, which is much more efficient than some of the two or more stroke inputs conventionally required.

What is claimed is:

1. A software keyboard system using a touch screen, comprising:

a screen displaying a keyboard image;

a touch panel on said screen, generating a coordinate value in accordance with a position pressed by a stylus;

a converter receiving said coordinate value and outputting a digital value;

a memory storing:
names of keys forming said keyboard image,
for each of said keys, a plurality of respective key codes, and
for each of said key codes, corresponding screen and direction range information;

a controller controlling said display of said keyboard image, receiving said digital value for a trace of said stylus, and determining the position and direction of said trace;

wherein said controller selects one of said key codes based on said position and on said direction of said trace, and wherein said controller controls said screen to display, in said keyboard image, an image of said generated key code for a predetermined time after said controller selects said one of said key codes, and then to restore said image of said generated key code to its original state.

2. The software keyboard system of claim 1, wherein said controller controls said screen to change a character color and a background color of said image of said generated key code.

3. The software keyboard system of claim 1, wherein said controller controls said screen to enlarge only said generated key code.

4. The software keyboard system of claim 1, wherein said memory further comprises:

key code tables, each corresponding to one of said keys, storing said corresponding screen and direction range information of said plurality of respective key codes, and a key information table storing said names of keys and address information indicating, for each of said keys, the corresponding one of said key code tables.

5. The software keyboard system of claim 1, wherein said direction range information is different for each of said plurality of respective key codes of one of said keys.

6. The software keyboard system of claim 5, wherein the direction range information of the key code includes a minimum value and a maximum value of said trace direction of said stylus.

7. A method for recognizing key codes, in a software keyboard system using a touch panel, comprising the steps of:

(a) displaying an image of a keyboard including keys with a plurality of key codes;

(b) obtaining the trace of a stylus;

(c) determining a key area in which the trace of the stylus is drawn;

(d) obtaining a direction of the trace drawn on the determined key area;

(e) searching key code information in accordance with the key area and the trace direction to generate a selected key code of the plurality of key codes of the key area; and (f) displaying on the image of the keyboard an image of the key code generated by step (e) to be distinguished from the others of the plurality of key codes, and then restoring the image to its original state.

8. The method of claim 7, wherein the step (b) of obtaining the trace of the stylus, comprises the steps of:

(b1) obtaining a coordinate value of a start point of the trace;

(b2) obtaining a coordinate value in which the stylus contacts the touch panel, after a predetermined time; and (b3) determining whether the point obtained in the step (b2) is an end point, thereby obtaining the end point of the trace.

9. The method of claim 7, wherein step (c) includes checking whether all coordinate values of the trace drawn by the stylus are within the range defined as a key area.

10. The method of claim 7, wherein step (c) includes checking whether a part of coordinate values of the trace drawn by the stylus is within the range defined as a key area.

11. A method for recognizing key codes, in a software keyboard system using a touch panel, comprising the steps of:

(a) displaying an image of a keyboard including keys with a plurality of key codes;

(b) obtaining the trace of a stylus;

(c) determining a key area in which the trace of the stylus is drawn;

(d) obtaining a direction of the trace drawn on the determined key area; and (e) searching key code information in accordance with the key area and the trace direction to generate a selected key code of the plurality of key codes of the key area, wherein said step (d) comprises the steps of:

(d1) obtaining a vector composed of coordinate values of a start point and an end point of the stylus trace;

(d2) calculating the magnitude of the obtained vector;

(d3) comparing the magnitude of the vector with the magnitude of a reference vector; and (d4) determining a trace direction to be zero when the vector magnitude is smaller than the magnitude of the reference vector, and obtaining the trace direction by calculating an angle between the vector and a reference line when the magnitude of the vector is larger than the magnitude of the reference vector.

12. The method of claim 11, wherein step (d1) comprises compensating for the stylus sliding on the touch panel by removing an initial unstable stroke from the trace.

13. A method for recognizing key codes, in a software keyboard system using a touch panel, comprising the steps of:

(a) displaying an image of a keyboard including keys with a plurality of key codes;

(b) obtaining the trace of a stylus;

(c) determining a key area in which the trace of the stylus is drawn;

(d) obtaining a direction of the trace drawn on the determined key area; and (e) searching key code information in accordance with the key area and the trace direction to generate a selected key code of the plurality of key codes of the key area, wherein said step (d) comprises:

dividing the trace of the stylus into a plurality of partial traces, defining vectors, each including coordinate values of a partial trace start point and a partial trace end point, each having a respective magnitude;

weighting each of the vectors with a value proportional to said respective magnitude to provide weighted vectors, and obtaining a trace direction of the stylus by averaging the weighted vectors.

* * * * *